Patented Nov. 18, 1930

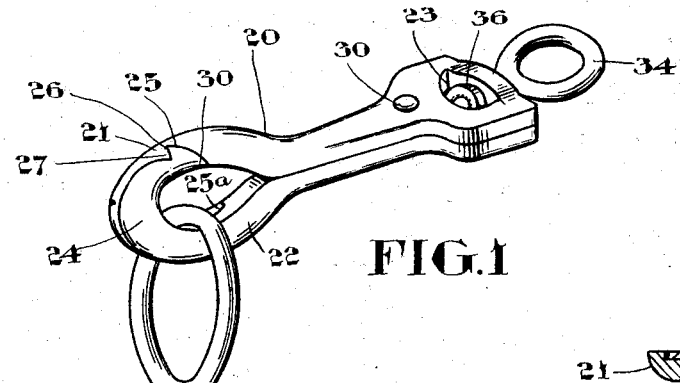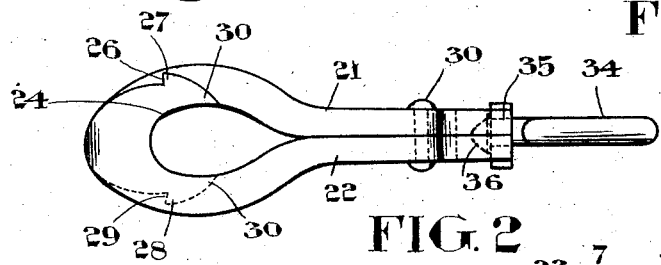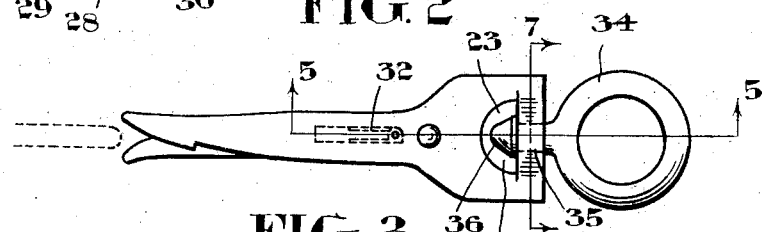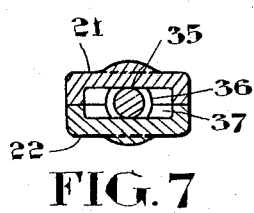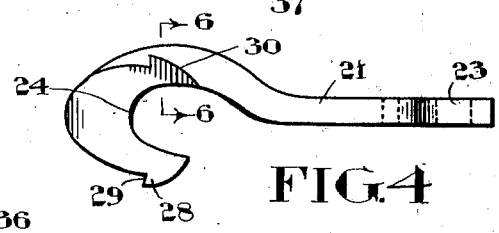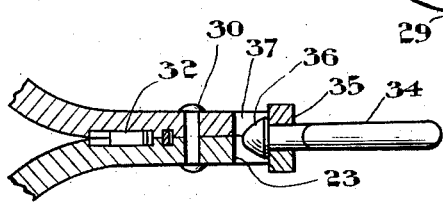

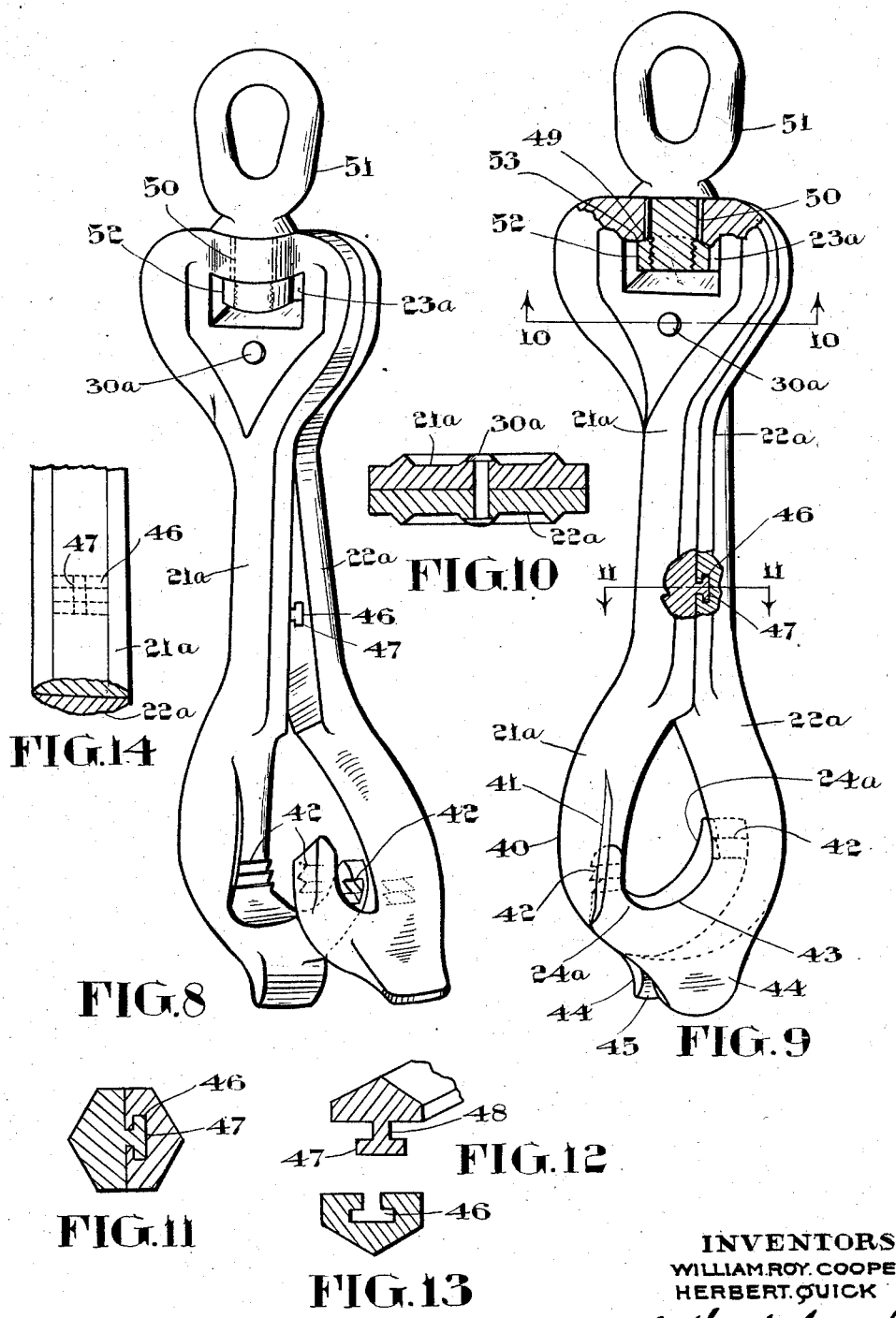

1,782,379

UNITED STATES PATENT OFFICE

WILLIAM R. COOPER, OF HUNTINGDON, QUEBEC, CANADA, AND HERBERT QUICK, OF NEW YORK, N. Y.

SNAP HOOK

Application filed February 11, 1929, Serial No. 339,120. Renewed October 16, 1930.

This invention relates to new and useful improvements in snap hooks, and the main object of the invention is to provide a hook of simple and robust construction which will be easily and quickly snapped over the load to be lifted.

Another object is to provide a snap hook of inexpensive construction which may be placed on the market in large quantities with the minimum amount of trouble.

A further object is to provide a hook, the component parts of which will be locked together to allow a predetermined movement between them, and which parts will be opened and pulled closed automatically by the load.

A still further object is to provide a snap hook, the component load engaging portions of which will be locked together against the direction of pull when lifting a load, forming a closed link of exceptional strength.

According to our invention we provide a pair of pivotally connected hook members designed to form a link, said hook members having co-acting projections and recesses whereby the said members in the closed position interlock and overlap, to distribute the stress due to loading evenly between them. Means are provided to prevent the members from becoming detached from one another and also to limit the opening movement of the hook. The members are attached to an eye bolt passing through an aperture formed in the members, said eye bolt having a collar adapted to draw the members together into their interlocking position when the hook is subjected to loading.

In the drawings which illustrate our invention:—

Figure 1 is a perspective view of one type of our improved snap hook.

Figure 2 is a plan view of the hook shown in Figure 1.

Figure 3 is a side elevation of the hook shown in Figure 1.

Figure 4 is a plan view of one of the hook sections.

Figure 5 is a sectional plan taken on the line 5—5 Figure 3.

Figure 6 is a sectional view taken on the line 6—6 Figure 4.

Figure 7 is a sectional view taken on the line 7—7 Figure 3.

Figure 8 is a perspective view of a modified type of hook made according to our invention, shown in the open position.

Figure 9 is a perspective view of the hook shown in Figure 8 but in the closed position. Parts of this figure are broken away to show details of construction.

Figure 10 is a sectional view taken on the line 10—10 Figure 9.

Figure 11 is a sectional plan taken on the line 11—11 Figure 9.

Figure 12 is a sectional plan view of one of the hook members with a T shaped locking member.

Figure 13 is a sectional plan view of one of the hook members with a T slot for engaging the T-shaped locking member.

Figure 14 is a side elevation of part of the shanks showing the shank connection.

Referring more particularly to the drawings, 20 designates a snap hook comprising hook members 21 and 22. Each member consists of a shank portion formed with an eye 23 at one end and a hook 24 at the other end, the hooked ends being substantially turned at right angles to the eye. The hooks when in assembled relation and in the closed position form a link. The ends 24 are recessed on one side as at 25, and on the other side as at 25$^a$ respectively, the recessed portions being notched at 26 on the inside to form a tongue 27 and on the outside at 28 to form a tongue 29 adjacent the extremity 30, so that when these members 21 and 22 are brought together they will overlap automatically and the tongue 27 on the member 21 will engage in locking position with the tongue 29 on the member 22, and while the tongue 27 on the member 21 registers with the notch 28 in the member 22, the tongue 29 registers with the notch 26 in the member 21. The members 21 and 22 are pivotally connected together by a pin 30 in proximity to the eye portions. The notches 26 and 28 are preferably formed on a slant, so that the greater the strain on the hook members when engaged, the better they will lock together.

The hook shown in Figures 1 to 7 inclusive, is for the smaller types and as will be seen the members 21 and 22 are spring actuated by means of a spring 32 arranged in a recess in the inner face of the shank registering with a similar recess in the other shank. An eye member or bolt 34 formed with a shank 35 having a bulbous end 36 is pivotally mounted in the space 37 formed by the eye 23, and the enlarged ends of the shanks 21 and 22 registering with one another. This eye bolt is provided for attaching or suspending the hook to a chain, rope, or such like tensioning or load bearing means.

In Figures 8 to 14 inclusive the heavier types of hooks are shown, and the spring closing means used in the lighter types of hooks is dispensed with, the hooked parts being heavy enough to close due to their own weight. The members 21ª and 22ª are pivotally attached together by the pin 30ª which is positioned in close proximity to the eyes 23ª. The ends 24ª are of hooked form and adapted to form a link when in the closed position, as shown in Figure 9. The outside edges 40 are provided with curved ribs 41 so that the load when being forced into the hook, that is between the members 21ª and 22ª, will turn the hooks. Projecting teeth 42 are formed in each of the hook portions in proximity to the curved ribs, which are adapted to overlie the free ends of the hooks to protect same. The teeth are so formed that they do not project beyond the edge of the rib. Recesses are formed in the free ends of the hooked portions of the members and are adapted to receive the teeth when the hook is in the closed position. The lower faces of the teeth project downwardly so that when a load is resting on the saddles 43 of the hooks, the said hooks will be drawn closely together and the load evenly distributed between the hook. The eyes extend preferably at right angles to the hooked portions. Lug extensions 44 are formed in the bottom of the hooks so that they are spaced apart to facilitate the entry between the hook of the load carrying chain or link, not shown. These extensions are preferably curved so that their lower edges 45 are spaced further apart and their bases coincide with the thickness of the hook. Formed in one of the shanks is the T-slot 46 adapted to receive the head 47 of a T-shaped projection 48 which may be formed integral with the hook, or said T-shaped projection may be made in the form of a bolt (not shown) but threaded to connect with the shank in the well known manner. The T bolt or projection sliding in the slot limits the opening movement of the members 21ª and 22ª. Formed in the adjacent faces of the eye portions are the curved recesses 49, to receive the shank 50 of an eye bolt 51, the lower end of which is threaded to receive a nut 52. The eye bolt rotates within the recesses which are made large enough to allow the eyes to move about their pivot connecting the members. The upper surface 53 of the nut is curved to fit into a cavity 49 formed within the eye. It will be seen that when load is applied to the hook, the curved surface of the nut riding in the co-acting curved recess in the eye tends to draw the members 21ª and 22ª together and hold them in this position during the time the load is hanging on the hooks. The T bolt limiting device is spaced from the pivot.

In operation the device shown in Figures 1 to 7 inclusive is forced together by the action of the spring and the hooked portions lock together to form a link or eye which is very strong. The co-acting tongues and notches assist in distributing the load evenly between the members forming the hook.

In assembling the device shown in Figures 8 to 14 inclusive, the members are turned at right angles to one another to allow the T projections to enter the T slot. The members are then brought together so that the teeth and the recesses fit into one another. The T connection prevents the members from becoming detached and limits their movement with respect to one another. The pivot pin is then inserted and riveted over. The eye bolt is placed in position and the nut brought into engagement with the eye bolt in such a manner that the curved surface of the nut fits into a curved portion formed at the lower edge of the shank receiving recess. It will be seen that in operation the load or chain (not shown) is pushed between the lugs on the underside of the members. This tends to spread them apart. The link or chain is pushed upwardly and is carried clear of the teeth by the projecting rib which extends outwardly from the hooked portion in the same direction as the teeth, to prevent the said link from fouling the teeth. The weight of the lower parts of the sections draws them together so that the teeth and recesses are drawn into engagement with the link resting on the saddles. The curved portions of the nut and the shank, when brought together by the pull of the load, tend to hold the members in engagement with one another so that the load is evenly distributed between the members.

A snap hook manufactured according to the foregoing is very easily assembled and is inexpensive to manufacture. Such snap hooks are efficient in operation and the load is evenly distributed between the members forming the hook.

Having thus described our invention, what we claim is:—

1. A snap hook comprising a pair of pivotally connected shank members each having an eye at one end and a hooked portion at the other end substantially at right angles to the transverse axis of the eyes, an eye bolt passing through recesses formed in the eye portion, and a nut having a curved surface fitting into a curved recess in the eye adapted to force the members together when load is applied to the hook portions.

2. A snap hook comprising a pair of pivotally connected shank members each having an eye at one end and a hook portion at the other end, said hook portions and shank having co-acting recesses and projections adapted to automatically engage with one another when the hooks are in overlapping relation, and an eye bolt passing through the eye, said bolt having a nut with a curved surface adapted to engage with a curved recess in the eye and to force the hooks into overlapping relation when load is applied to the hook.

3. A snap hook comprising a pair of pivotally connected shank members, each having an eye formed at one end and a hooked portion at the other end at substantially right angles to said eye, co-acting projections and recesses adapted to automatically engage with one another when the hook is in the closed position, means formed in the hooked portions remote from the pivot to facilitate pivoting of the shank members, guards formed in the hook to protect the projections and recesses, a T slot connection between the members to hold them together and prevent their separation, and eye bolt connections between the eye portions of the shank members, said eye bolts having curved portions adapted to fit into curved recesses in the eye to pull and hold the members together when load is applied to the hook.

4. A hook comprising a pair of pivotally connected members, each of said members having an eye at one end and a hook bill at the other end, the hook bills of the two members being adapted to overlap in the closed position of the hook, the hook bill of each member being provided adjacent the tip portion thereof with a projection adapted to interlock with projections formed on the other member when the hook bills are disposed in overlapping relation.

5. A hook as recited in claim 4, in which each member is provided with a guard rib lying at one side of and projecting beyond the projection formed in said member.

6. A hook comprising a pair of pivotally connected members, each having an eye at one end and a hook bill at the other end, a series of projections formed in each member in proximity to the base of the hook and a series of complementary projections formed in the tip portion of each hook bill and the said hook bills being disposed in overlapping relation in the closed position of the hook, with the projections of each hook bill engaging the projections formed on the member carrying the complementary hook bill.

In witness whereof, we have hereunto set our hands.

WILLIAM R. COOPER.
HERBERT QUICK.